H. BATES.
MODE OF CLINCHING SPIKES, &c.
No. 16,958.  Patented Apr. 7, 1857.
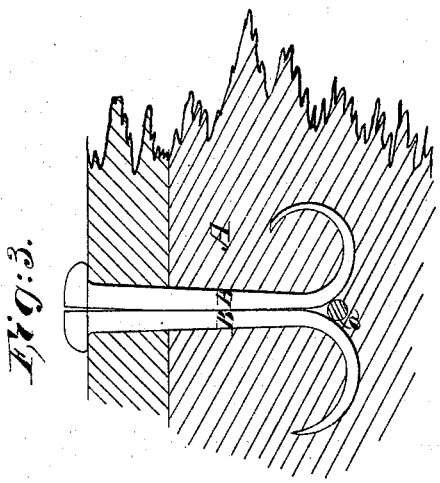
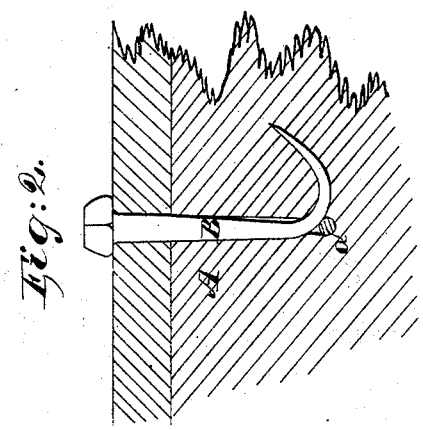
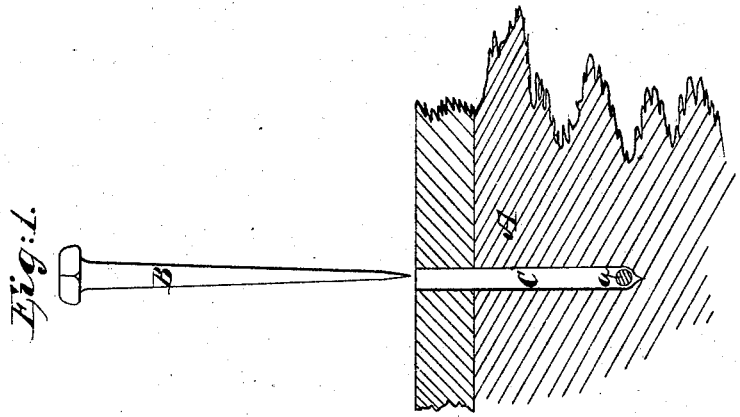

UNITED STATES PATENT OFFICE.

HORATIO BATES, OF NEW YORK, N. Y.

MODE OF CLENCHING SPIKES.

Specification of Letters Patent No. 16,958, dated April 7, 1857.

*To all whom it may concern:*

Be it known that I, HORATIO BATES, of the city, county, and State of New York, have invented a new and useful Mode of Clenching Spikes and Nails when Driven Into and Only Partly Through Timber; and I do hereby declare that the following is a full, clear, and exact description of the same, reference being had to the accompanying drawings, forming part of this specification.

My invention consists in boring in the timber a hole of less depth than the spike or nail to receive it and dropping or inserting thereinto before the spike or nail, a ball or other piece of iron or other hard metal. When the spike is driven, the point, coming in contact with this ball or piece of metal, is deflected and the end is caused to curl up in the timber in the form of a hook and thus to clench itself.

Figure 1, in the drawing exhibits a section of a piece of timber with the hole bored to receive the spike and an iron ball dropped to the bottom of the said hole, and represents the spike ready for insertion. Fig. 2, exhibits a similar section of the timber with the spike driven and clenched. Fig. 3, is a similar section exhibiting two spikes clenched in the same hole by one ball of iron.

Similar letters of reference indicate corresponding parts in the several figures.

A, is the timber.

C, is the hole to receive the spike.

*a*, is the ball or clenching piece.

B, B, are spikes.

The hole C, is bored of such size that the spike or spikes may drive in tightly. The ball or clenching piece *a*, is of such size that it may enter snugly into the hole to the bottom of which it is dropped or driven before the spike is put in. I prefer these of iron of spherical form or as nearly so as convenient. When a spike is driven into the hole after the insertion of the ball or clenching piece, the point of the spike, meeting it is sure to turn aside and pass in a lateral direction and generally upward or backward until, when the spike is driven home, its end forms a hook or clench, substantially as shown in Fig. 2. The hook may be made to take any direction, by giving the spike a slight blow to deflect its point slightly from its center before inserting it into the hole, the point being then caused to pass on that side of the ball toward which it is directed on insertion. It will generally, however, be unnecessary to bend the spike purposely, as the spikes, as obtained from the manufacturer, generally have their points a little out of center in one direction or another. Two spikes driven into the same hole, side by side, will be caused by a single ball or clenching piece *a*, to have their points deflected in opposite directions or from each other and form a double clench, as shown in Fig. 3.

I am aware that a clenching piece in the form of a small spike has been driven by the side of a spike to lock the same by its action against a jog or offset on the adjacent side thereof, as described in the patent of J. H. Wygant, but that mode of locking the spike requires the spike to be specially constructed for the purpose and I consider it less secure, while it is a more expensive mode of confining the spike than my method, which is applicable to common spikes or wrought nails of any kind, and makes the clench on the spike or nail itself.

I disclaim any such method of locking the spike as that above mentioned but

What I claim as my invention and desire to secure by Letters Patent, is:

Securing a spike or nail by boring a hole in the timber of less depth than the spike or nail itself to receive it, and inserting thereinto, before the spike or nail, a ball *a*, or lump of metal of substantially similar character, to deflect the point thereof when it is driven, and thereby cause it to clench itself, substantially as herein described.

HORATIO BATES.

Witnesses:
W. TUSCH,
WM. HAUFF.